Dec. 9, 1969   S. G. ATKINS ET AL   3,482,641
APPARATUS FOR EARTH CORING
Filed Feb. 23, 1967   3 Sheets-Sheet 1
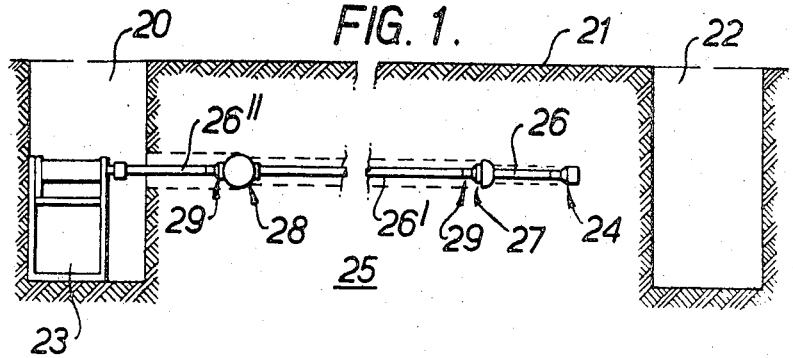
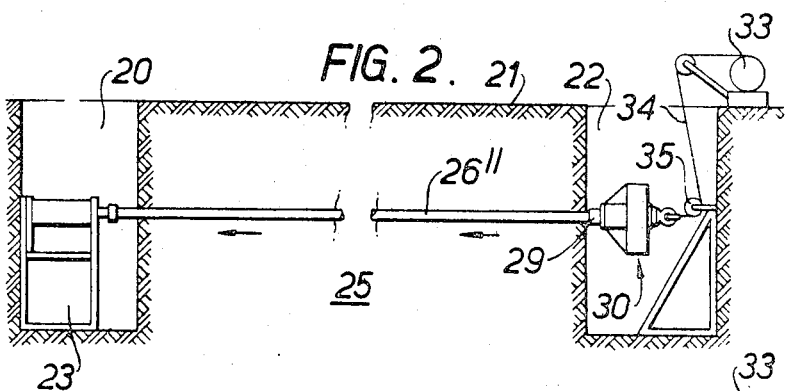
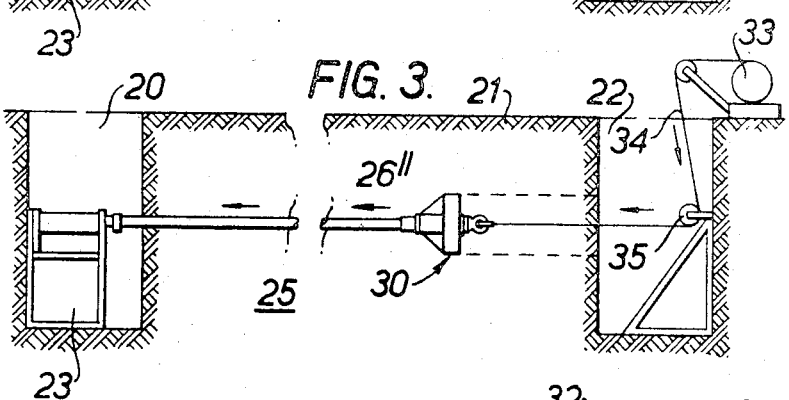
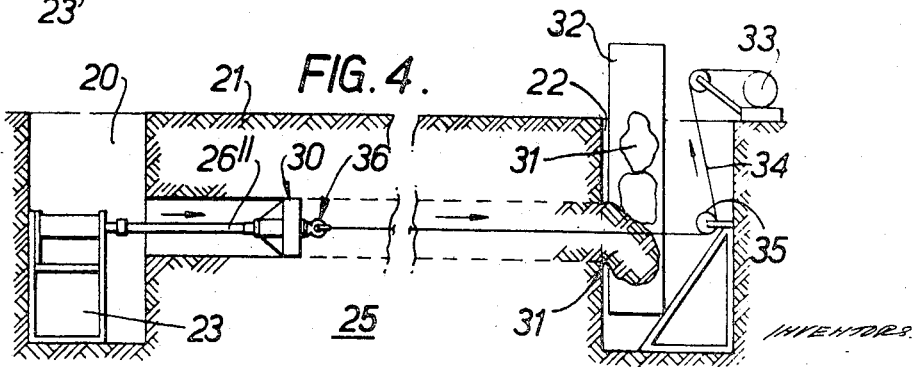

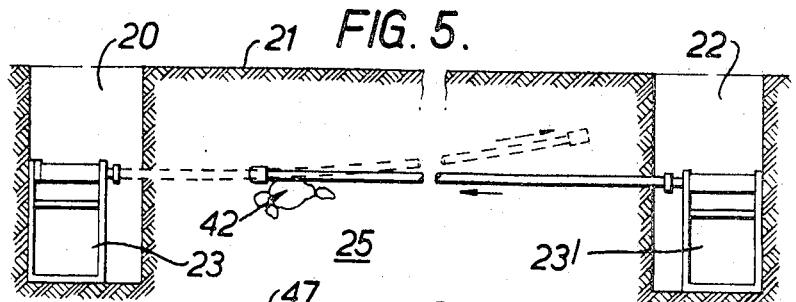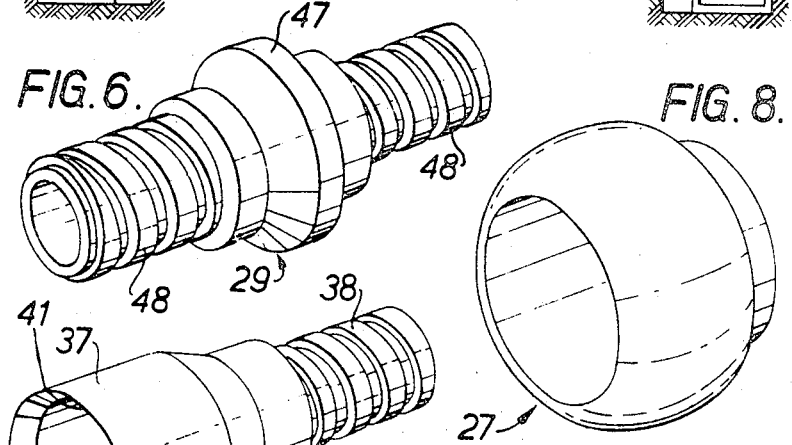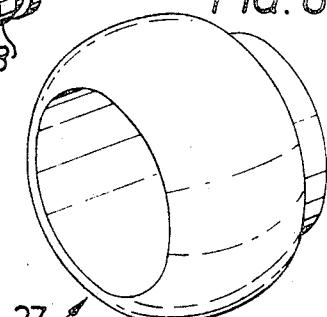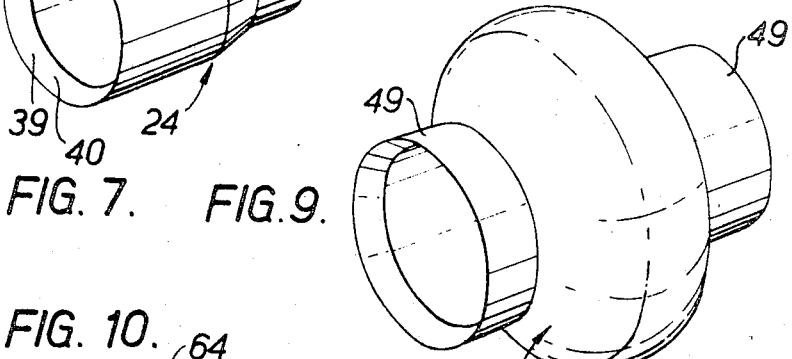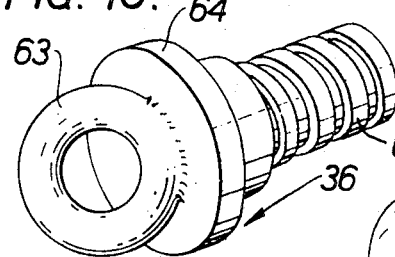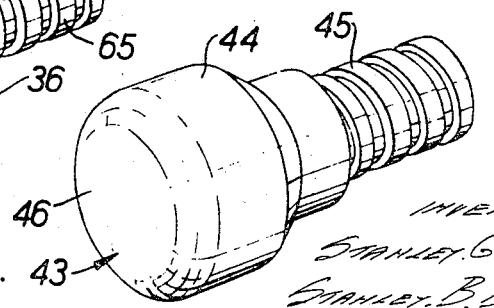

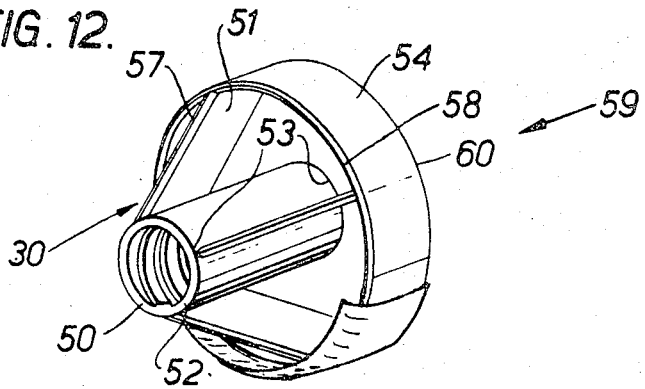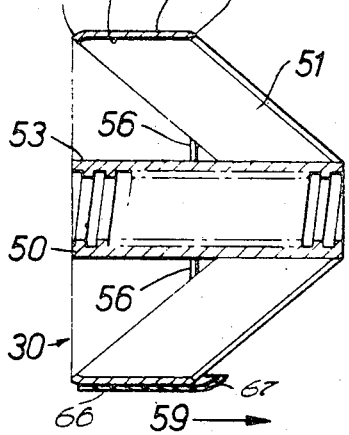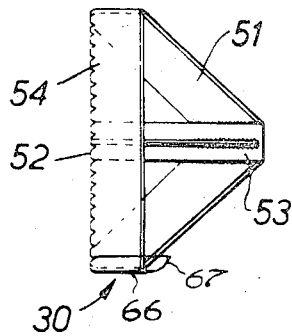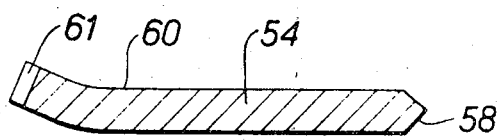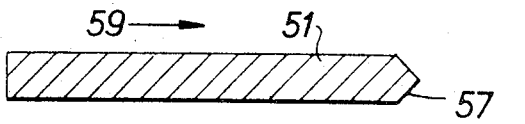

United States Patent Office 3,482,641
Patented Dec. 9, 1969

3,482,641
APPARATUS FOR EARTH CORING
Stanley G. Atkins, 804 Stewart St., and Stanley B. Bailie, 824 Muriel St., both of Winnipeg, Manitoba, Canada
Filed Feb. 23, 1967, Ser. No. 617,916
Int. Cl. E01g 3/04; E21b 11/02; E21c 19/00
U.S. Cl. 175—19         3 Claims

ABSTRACT OF THE DISCLOSURE

Apparatus for earth coring consisting of a push type forming head for forming a pilot hole through the earth mass to be cored with a rod connecting the head to a source of power for pushing the head through the earth mass and having an expander and wall compactor on the rod but spaced from the head to expand the size of the hole and to compact the walls thereof.

---

Our invention relates to new and useful improvements in methods and apparatus for forming cored holes through earth formations.

The invention is primarily concerned with forming a core or tunnel extending horizontally through earth formations over relatively long distances for the installation of sewer or water lines or any other services that are to be installed under ground and that require a pre-cut channel whether it be round, square, rectangular or triangular.

While many devices are in existance for forming relatively small diameter holes or bores over relatively short distances, these devices suffer from severe disadvantages when the distance to be cored extends for example, 25 or 30 feet or more.

For relatively short distances and small diametered holes rotating augers are used. However, these require relatively large operating pits to hold the apparatus required to rotate the auger and also to provide working space for the operators, particularly in removing the soil augered by the device.

Pull or push type cutters (so named to distinguish them from rotative types) have been used such as shown by C. C. Merrick, U.S. Patent 2,664,273 but these are only usable over relatively short distances due to the excessive power required in moving a core of earth over any distance. This is because said core normally presents considerable frictional resistance to the surrounding walls so that tremendous power is required to extrude same.

Merrick attempts to overcome this condition by compressing the core as it is formed but hereagain extreme amounts of power are required so that this type of apparatus is restricted to relatively small diameter apertures over relatively short lengths.

Another disadvantage of this type of cutter is the fact that when the coring or tunnelling is being done at any depth, the compressive forces of the surrounding soil have a tendency to jamb the tool and in fact, when driving a pilot hole utilizing the method described in the above patent, it is quite usual for the compressive forces to jamb the driving rods securely so that they become irremovable.

We have overcome all of these disadvantages and have provided a method and apparatus of forming cored holes of almost any diameter over extreme distances.

We are enabled to obtain these results firstly, by providing a pilot hole cutter which inherently maintains a straight line when being driven and followed the pilot hole head with a pilot hole expander which compresses the surrounding earth outwardly and enlarges the hole slightly thus eliminating frictional resistance between the walls of the hole and the rods following the pilot hole head.

Under extreme conditions, more than one expander can be used in series along the length of pilot hole head rods.

Once the pilot hole has been formed, our novel cutter is then pulled rearwardly through the pilot hole thus cutting a segmented plug of soil and forming striations on the outer surface of this plug which reduces the suction between the plug and the walls of the hole thus enabling same to be extruded on the next pass of the cutter head.

The principal object and essence of our invention is therefore to provide a method and apparatus for coring or forming tunnels through relatively long earth formations with the minimum of power and at a relatively rapid rate.

Another object of the invention is to reduce frictional coefficient between the plug and the surrounding walls thus enabling same to be extruded with the minimum of power.

A yet further object of the invention is to expand the pilot hole or core thus eliminating frictional resistance between the driving pipes and the walls of the pilot hole and also preventing same from collapsing until the cutting tool can be drawn therethrough.

A still further object of our invention is to eliminate the necessity for forming operating pits every 20 or 30 feet inasmuch as our device can be utilized over relatively long distances between operating pits.

A yet further object of our invention is to provide a method and apparatus which can be used with the minimum of labor, can form cores or tunnels through soil formations rapidly and easily, is economical in construction, and simple in operation, and otherwise well suited for the purpose for which it is designed.

In summary, the invention relates to apparatus for earth coring which includes a push type head on the end of a rod or rods and having a pilot hole expander and wall compactor on the rods and spaced behind the head, said expander being substantially spherical and being freely slidable on the rods with means to limit this sliding movement.

With the foregoing in view, and such other objects, purposes or advantages as may become apparent from consideration of this disclosure and specification, the present invention consists of the inventive concept in whatsoever way the same may be embodied having regard to the particular exemplification or exemplifications of same herein, with due regard in this connection being had to the accompanying figures in which:

FIGURE 1 is a schematic view of our invention showing the pilot hole being formed and the pilot hole being expanded.

FIGURE 2 is a schematic view showing the hole cutter in position.

FIGURE 3 is a view similar to FIGURE 2 but showing the hole cutter part way through the formation.

FIGURE 4 is a schematic view showing the cutter being used to extrude the plug formed by the cutter.

FIGURE 5 is a schematic view showing how the pilot hole can be re-aligned if deflected due to rocks or the like.

FIGURE 6 is an isometric view of one of the couplings used between pipe sections.

FIGURE 7 is an isometric view of one of our pilot hole forming head.

FIGURE 8 is an isometric view of one of our pilot hole expanders.

FIGURE 9 is an isometric view of another of our pilot hole expanders.

FIGURE 10 is an isometric view of the attaching hook securable to the cutting head.

FIGURE 11 is an isometric view of the plug head utilized to correct deviant pilot holes.

FIGURE 12 is an isometric view of the cutter head assembly.

FIGURE 13 is a vertical section of FIGURE 12.

FIGURE 14 is a side elevation of FIGURE 13.

FIGURE 15 is an enlarged sectional view through the cutting ring of the cutter head assembly.

FIGURE 16 is an enlarged section through one of the fins.

In the drawings like characters of reference indicate corresponding parts in the different figures.

Proceeding therefore to describe our invention, reference should first be made to FIGURES 1 to 4 inclusive in which 20 illustratives a first pit dug downwardly from the surface 21 of the soil and 22 the second pit also formed in the soil at a distance remote from the first pit 20.

A source of power indicated schematically at 23 is placed within the first pit and this source of power is conventional. Briefly, it provides means for moving pipe lengthwise in non-rotative fashion, by means of piston and cylinder and gripping jaws.

There are many forms of this type of source of power so that details are not believed necessary in the specification.

This source of power 23 urges a pilot hole forming head 24 horizontally through the soil mass 25 between the pits 20 and 22.

The pilot hole head assembly 24 is connected to the source of power by lengths of pipe 26, 26' and 26", additional lengths being provided as the pilot hole head assembly is moved towards the second pit 22.

A pilot hole expander and wall compactor 27 is situated upon the end of pipe 26 spaced from the assembly 24 and a second pilot hole expander 28 is placed upon the pipe 26', spaced from the first expander 27.

The expanders 27 and 28 fit loosely upon the pipes and are positioned by means of rib couplings 29, details of which are hereiafter explained.

When the pilot hole head assembly 24 breaks through into the second pit 22, it is removed from the pipe 26 and also the expanders 27 and 28 and a cutter assembly collectively designated 30 is secured to the end of the pipe 26 as shown in FIGURE 2.

This cutter assembly is then pulled in a non-rotative manner, from pit 22 to pit 20 by means of the source of power 23 thus forming a segmented core due to the construction of the cutter assembly, this process being shown in FIGURE 3.

Once the cutter assembly has been pulled clear through to the first pit 20, the action of the source of power 23 is reversed and the cutter assembly is moved or pushed towards pit 22 thus extruding the plug of coil 31 into the second pit 22 whereupon it may be removed manually or, alternatively, by means of a conveyor collectively designated 32 and shown schematically in FIGURE 4.

It is desirable but not necessary to provide an additional source of power in pit 22 taking the form of a winch 23 and cable 34 passing over cable sheave 35 and being secured to the cutter assembly by means of the hook 36 secured to the cutter assembly.

Once the initial cut has been made, the diameter of the bore of the hole may be increased by moving successively large cutter assemblies back and forth between the pits 22 and 20.

In detail, the pilot hole head assembly 24 is shown in FIGURE 7. It comprises a substantially hollow cylindrical body having a reduced externally screw threaded attaching end 38 formed therewith, said end being adapted to be screwthreadably secured internally to the pipe 26.

The leading edge or end 39 of the portion 37 is inwardly chamfered as at 40 thus providing a cutting edge 41 and also acting as a self guiding means as it is being driven through the soil. This is because of the inwardly facing chamfer 40 tending to maintain the head on the original line of thrust.

However, occasionally, the pilot hole assembly is deflected from the line of thrust as shown in FIGURE 5 due to rocks 42 or the like under which circumstances, the original line of thrust has to be found.

Under these circumstances, we provide a further source of power 23' in the second pit 22 and drive the pilot hole from this pit 22 towards the pit 20. Under these circumstances we use a corrector head collectively designated 43 and shown in detail in FIGURE 11.

This comprises a cylindrical body 44 having a reduced diameter externally screw threaded end 45 whereby the device may be attached to the end of pipe 26 in place of the pilot hole head 24.

The front face 46 of this plug head is substantially hemispherical and tends to follow the path of least resistance so that we have found that when the corrector plug is driven towards the partially formed pilot hole, it tends to seek this pilot hole as soon as it is adjacent thereto.

The pipe 26 is approximately 10 ft. in length and is joined to the next pipe section 26' by means of a flanged coupling shown in detail in FIGURE 6 and indicated by the reference character 29.

It consists of a central flange 47 having externally screw threaded reduced diameter coupling portion 48 formed upon either side thereof as clearly indicated.

The ends of the pipe sections 26 and 26' engage these screw threaded portions thus presenting an aligned section with the flange 47 extending beyond the diameter of the outside of the pipe.

The first expander 27 is substantially spherical in configuration as shown in FIGURE 8 and is centrally apertured. This expander is slipped over the pipe 26 and engages the flange 47 which prevents rearward displacement of the expander and locates it in the desired position along the pipe length.

The transverse diameter of the expander 27 is greater than the transverse diameter of the pilot hole head assembly 24 so that as it is drawn through the pilot hole, it enlarges the pilot hole slightly and compresses the soil outwardly therefrom thus compacting the walls of the pilot hole.

Under certain circumstances a second expander 28 is required and this is shown in detail in FIGURE 9.

Once again the pipe length 26' is joined to the pipe length 26" by means of the coupling 29 and the second expander is also substantially spherical in configuration with collars 49 being formed on the end thereof, said collars and said expander being drilled clear through so that the expander slides freely on the pipe 26' but is restricted from the further rearward movement by means of the flange 47 of the coupler 29.

The transverse diameter of the expander 28 is slightly greater than the transverse diameter of the expander 27 thus giving additional compression to the soil surrounding the pilot hole.

These expanders not only eliminate frictional contact of the pipes with the wall of the pilot hole but also prevent the pilot hole from collapsing until the cutter assembly 30 can be drawn therethrough.

As hereinafter described, once the pilot hole has been formed, the pilot hole head 24 and the expanders 27 and 28 are removed within the second pit 22 and the cutter assembly collectively designated 30 is screw threadably engaged upon the coupler 29 remaining upon the pipe length.

The cutter assembly is shown in detail in FIGURES 12 to 16 inclusive.

It comprises a hollow cylindrical body portion 50 internally screw threaded at both ends and having a plurality of radially extendng fins 51 secured adjacent the leading end 52 of the body portion by means of welding.

It is preferred that four such fins are provided situated equidistantly around the body portion 50 but of course any number can be utilized depending upon circumstances.

These fins incline outwardly towards the other or trailing end 53 of the body portion and are surrounded by a cutter ring 54 which is welded to the ends 55 of the fins 51, all of which is clearly shown in FIGURES 12, 13 and 14.

If the cutter assembly is of relatively large diameter then stiffeners 56 may be incorporated between the fins 51 and the body portion 50.

The leading edges 57 of the fins are edge sharpened as shown in FIGURE 16 and the leading edge 58 of the cutter ring 54 is also edge sharpened as shown in FIGURE 15, it being understood that when the cutter is in cutting operation, it travels in the direction of arrow 59.

The portion of said cutter ring adjacent the trailing edge 60 and said trailing edge 60 of the cutter ring 54 is turned inwardly or angulated inwardly towards the body portion as clearly shown in FIGURES 13, 14 and 15, the angle made between the turned in portion 60 and the main body of the cutter being obtuse.

V-shaped notches 61 are formed around the perimeter of the inturned portion 60 and these notches form longitudinal striations upon the surface of the core formed by the operation of the cutter thus relieving suction between the core and the surrounding walls.

As the cutter assembly is pulled through from the second pit 22 towards the first pit 20, as shown in FIGURE 3, the diagonally situated fins cut into the soil surrounding the pilot hole and in advance of the leading edge 58 of the cutter ring.

The cutter ring forms the cylindrical plug which is in four segments as it is formed due to the fact that the fins have already passed through the soil forming the plug.

The inturned trailing edge of the cutter ring scrape along the outside surface of the plug and the V-shaped notches 61 form striations thereon.

When the operation of the cutter assembly is reversed as shown in FIGURE 4, in the inturned trailing edge 60 of the cutter assembly becomes the leading edge and digs into the plug and extrudes same into pit 22, the greater the pressure, the greater the wedging effect of the cutter assembly upon the end of the plug so that the plug is prevented from breaking up at this point and the cutter assembly acts as a solid ram to extrude the plug as shown in FIGURE 4.

The aforementioned striations formed upon the surface of the plug reduce the frictional coefficient between the plug and the wall of the hole thus eliminating the need of excessive power.

If it is desired to use the winch assembly 33 to facilitate the extruding of the plug, then the hook assembly 36 shown in detail in FIGURE 10 is secured to the trailing end 53 of the body portion 50.

This hook comprises a closed eye 63 secured to a cylindrical plate 64 to which is attached an externally screw threaded bolt portion 65 adapted to engage within the screw threaded end 53 of the body portion 50.

This permits the end of the cable 34 to be secured to the cutter assembly and to supply pulling power thereto.

If it is desired that large diameter cores be provided then once the cutter assembly has been operated, it is replaced with a larger cutter assembly and the process repeated and we have found it possible to form cores or tunnels of as large as 48 in. in diameter by means of this method and apparatus.

However, it will be appreciated that when relatively large diameter cutters are being utilized, there is a tendency for the cutter to dig in and perhaps gouge the bottom portion of the hole being formed.

We have prevented this by providing means to support the cutter while it is being pulled through from one pit to the other, said means taking the form of a cutter ring supporting plate 66 curved to conform to the curvature of the cutter ring 54 and being secured thereto as shown in FIGURE 14.

The length of this plate is longer than the length of the cutter ring and the leading edge 67 of the plate is upturned as shown so that a curved skid is provided to support the cutter ring upon the lower arc of the hole being formed.

The important features of the invention are firstly the construction of the pilot hole head 24 followed by the expanders 27 and 28 and then the construction of the cutting head assembly with the inturned trailing edge and the V-shaped notches formed therein which not only striates the surface of the plug but also facilitate the extrusion of the plug after it has been formed.

Various modifications can be made within the scope of the invention concept disclosed.

What is claimed as our invention is:

1. Apparatus for forming a pilot hole prior to earth coring, comprising in combination a source of power, a push type forming head for forming a pilot hole through the earth mass to be cored, rods connecting said head to said source of power for pushing said head through said earth mass, at least one pilot hole expander and wall compactor in series with said rods and spaced from said head, means for mounting said pilot hole expander and wall compactor freely upon said rods, said means including said pilot hole expander and wall compactor being apertured clear through and being mounted for free sliding engagement upon said rods, means to limit said free slid ing engagement, a further pilot hole expander and wall compactor in series with said first mentioned expander and compactor, said further expander and compactor also being apertured clear through and being mounted for free sliding engagement upon said rods, and further means for limiting said last mentioned free sliding engagement, said further means for limiting said last mentioned free sliding engagement of said further expander and compactor upon said rods including collar means detachably securable upon said rods upon each side of said further expander and compactor.

2. In an apparatus for forming a pilot hole through earth prior to coring, the combination of a sectional push rod having a leading end and consisting of at least two longitudinally aligned rod sections and coupling means separably connecting said rod sections together, a power actuator for pushing said sectional push rod in the direction of its leading end, a pilot hole forming head provided at the leading end of said sectional push rod, a pilot hole expander and wall compactor longitudinally slidably positioned on said sectional push rod in rearwardly spaced relation from said head and between said head and said coupling means, and means for limiting rearward sliding movement of said expander and compactor on said rod, said limiting means comprising an annular flange provided on said coupling means for abutment with said expander and compactor when the expander and compactor is slid rearwardly on said rod to said coupling means.

3. The apparatus as defined in claim 2 wherein said expander and compactor comprises a substantially spherical body of a substantially greater diameter than said head, said body being formed with a central aperture slidably receiving said rod.

References Cited

UNITED STATES PATENTS

| | | | |
|---|---|---|---|
| 1,370,031 | 3/1921 | Mangnall | 175—19 |
| 2,288,576 | 6/1942 | Titcomb et al. | 175—19 X |
| 2,664,273 | 12/1953 | Merrick | 175—53 X |
| 2,923,133 | 2/1960 | Muller | 175—19 X |
| 3,011,567 | 12/1961 | Turner | 175—53 |

FOREIGN PATENTS

| | | |
|---|---|---|
| 181,788 | 6/1922 | Great Britain. |
| 581,358 | 8/1959 | Canada. |

CHARLES E. O'CONNELL, Primary Examiner

R. E. FAVREAU, Assistant Examiner

U.S. Cl. X.R.

175—53, 62, 390